United States Patent [19]
Ebert et al.

[11] 3,918,333
[45] Nov. 11, 1975

[54] ADJUSTABLE TOOL HOLDER

[75] Inventors: Gary R. Ebert, Dearborn; Roy H. Flones, Clare, both of Mich.

[73] Assignee: Ex-Cell-O Corporation, Troy, Mich.

[22] Filed: May 10, 1974

[21] Appl. No.: 468,965

[52] U.S. Cl. .................................. 82/36 R; 29/98
[51] Int. Cl.² ................... B23B 29/00; B26D 1/00
[58] Field of Search ...... 29/96, 98; 82/35, 36, 36 A, 82/37, 38

[56] References Cited
UNITED STATES PATENTS

| 735,138 | 8/1903 | Normand | 82/37 |
| 970,219 | 9/1910 | Haldy | 82/37 |
| 2,125,005 | 7/1938 | Jearum | 29/96 |
| 2,913,935 | 11/1959 | Flannery et al. | 29/96 |
| 3,079,815 | 3/1963 | Briney, Jr. et al. | 82/36 |
| 3,841,179 | 10/1974 | Brown | 82/35 |

*Primary Examiner*—Harrison L. Hinson

[57] ABSTRACT

This invention is an apparatus to provide for micro adjustment of a cutting tool while holding it in a stable rigid position and permitting repeatable characteristics by having a concentric face plate and shaft in an eccentric bushing with a predetermined axial preload.

12 Claims, 3 Drawing Figures

ADJUSTABLE TOOL HOLDER

BACKGROUND OF THE INVENTION

1. Field of the Invention

This invention relates to adjustable tool holders and in particular to an improved tool holder which is designed to provide a rigid, adjustable means of micrometer motion to cutting tools for boring, facing and turning operations.

2. Description of Prior Art

Adjustable tool holders have been well known in the art of metal cutting for many years and various methods have been devised for adjusting the horizontal and vertical axis of the tip of the cutting tool. Many of these methods only allow for a very course adjustment and rely on the cross feed of the particular machine to adjust the tool in an horizontal direction. Other methods allow for a pivoting action to adjust the vertical axis of the cutting tip, which again is very course and time consuming if a precise adjustment is required.

SUMMARY OF THE INVENTION

This invention incorporates the feature of an eccentric bushing to allow a cutting tool attached to the face plate of it to have its tip adjusted in a circumscribed plane within a given stroke. In addition, it also has the facility for adjusting the axial direction through a preloaded roller thrust bearing and micrometer thread adjustment to provide a given movement while retaining the rigidity of the adjustable assembly. It further has a calibrated dial to assist in making adjustments in exact increments.

This combination of features results in the elimination of the lost motion associated with tool adjustments and, further, it assures repeatability of the setup while maintaining its accuracy.

A BRIEF DESCRIPTION OF THE DRAWINGS

DESCRIPTION OF THE INVENTION

Figure 1:
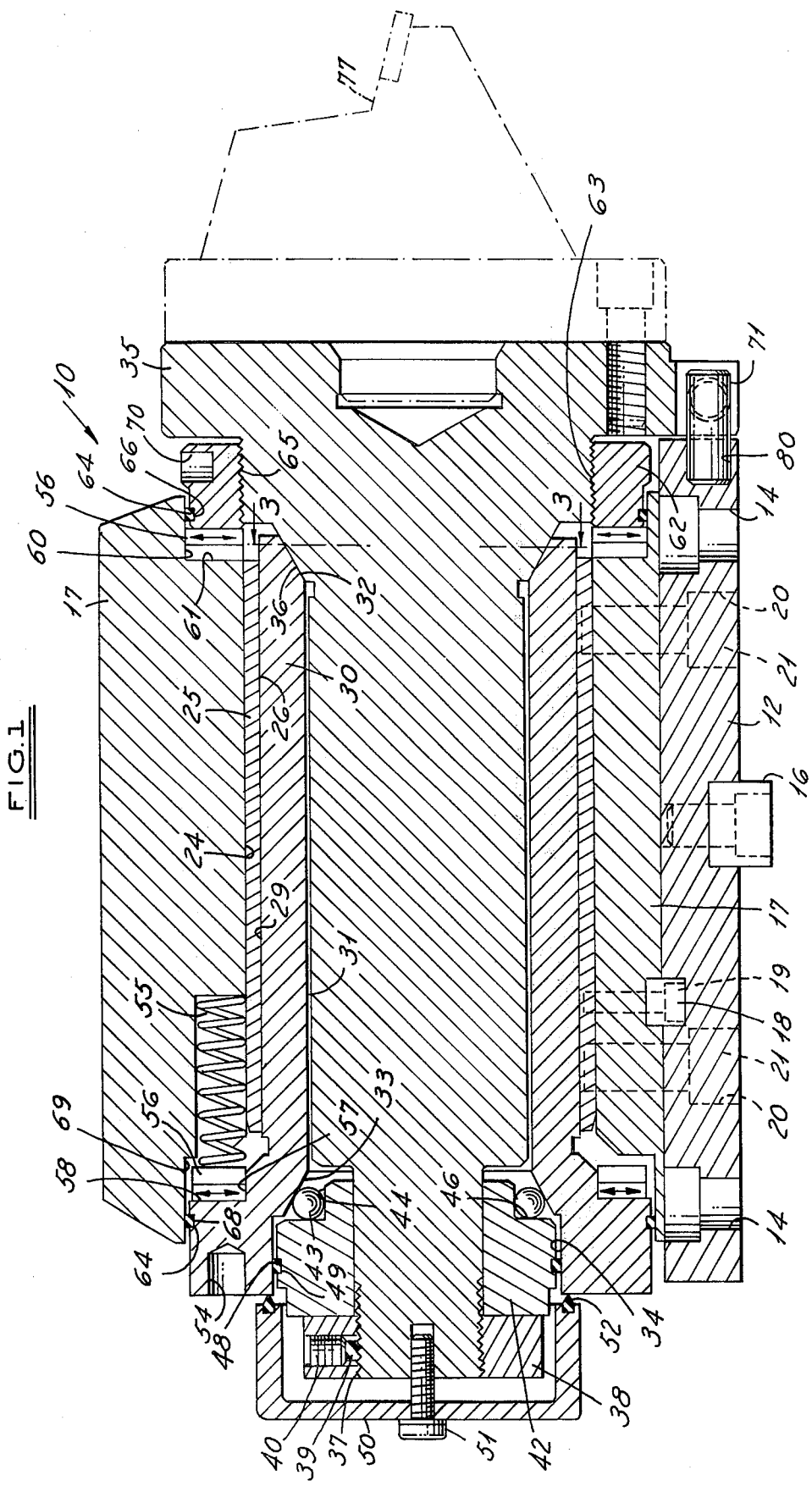
FIG. 1 is a sectional view of the tool holder showing the detailed working parts.

The adjustable tool holder assembly 10 is shown detailed in FIG. 1 and, as illustrated, is shown in an horizontal position. A mounting plate 12 is used to secure the assembly to a suitable work table or machine surface using socket head cap screws and holes 14. Two keys 16 are used to locate the mounting plate 12 to the machine surface. The mounting plate 12 is then keyed and attached to the body 17 of the assembly. A socket head cap screw 19 secures key 18 to the body 17 which locates it on the mounting plate 12. Two keys 18 are used to insure accurate alignment. The plate 12 is affixed to the body 16 with socket head cap screws 21 located in holes 20 and threaded into the body 16.

Bore 24 is fitted with a liner bushing 25 which is a press fit into bore 24. The inside bore 26 of bushing 25 is machined as a tight slip fit for the outside diameter 29 of eccentric bushing 30. Bore 31 centerline of eccentric bushing 30 is offset a predetermined amount (for example, by 0.012 of an inch) which then causes the centerlines of conical surfaces 32 and 33 to also be offset, as well as the centerline of bore 34 which is a clearance hole for bearing race 42.

Face plate and shaft 35 are located within eccentric bushing 30 and locate against face 32 with surface 36. Thread 37 is provided on one end of shaft 35 with a preload nut 38 which takes up the slack on the eccentric bushing 30 and the ball bearing race 42 to properly preload the bearings. This nut is held in place by a brass or nylon plug 39 and set screw 40. Bearing race 42 has ball bearings 43 located on surface 44 and surface 46 which forms a 90° corner that wedges ball 43 against conical surface 33 of eccentric bushing 30. A seal 48 is provided to keep dust and other contaminants out of the ball bearing race area. Seal 48 is slidably affixed in slot 49 of bearing race 42 and can turn freely. Seal cap 50 and screw 51 and seal 52 act as a dust cap to prevent external contaminants from getting into the bearings.

Hole 54 is provided in eccentric bushing 30 for a spanner type wrench to engage the eccentric bushing 30 for adjustment purposes. A series of springs indicated by numeral 55, such as twelve, are equally spaced in housing 16 around liner sleeve 25 as preload springs for adjustment purposes which will become obvious later. A needle bearing 56 is accurately located on diameter 57 of eccentric bushing 30 and surface 58. Another needle bearing 56 is located on diameter 60 and surface 61 of body 17. This bearing is held in place by an axial adjustment nut 62 which has micrometer threads 63 on its I.D. mating with micrometer threads 65 on face plate and shaft 35. A quad-ring seal 64 is located in slot 66 on the axial adjustment nut 62 to prevent dust from getting inside the needle bearing. A similar quad-ring seal 64 is located in slot 68 in eccentric bushing 30 and diameter 69 in body 17 to prevent dust and other contaminants from getting into needle bearing 56 located in contact with springs 55. Bore 70 allows for a spanner wrench adjustment of axial adjustment nut 62 during operation. Dowel 71 and set screws 73 and 74, better seen in FIG. 2, locate face plate and shaft 35 and secure it from any rotational movement. Key slot 75 and bore 76 are used to locate a cutting tool 77 shown in phantom. Socket head cap screws 78 secure the tool 77 in place. Dowel 71 is located in bore 80 in mounting plate 12 to accurately locate it. Dowel 71 prevents rotation of the face plate and shaft 35 when either axial or the vertical plane adjustments are made, yet the dowel allows the radial and axial adjustment to be made without loosening the set screws 73 and 74.

OPERATION OF THE INVENTION

Figure 2:
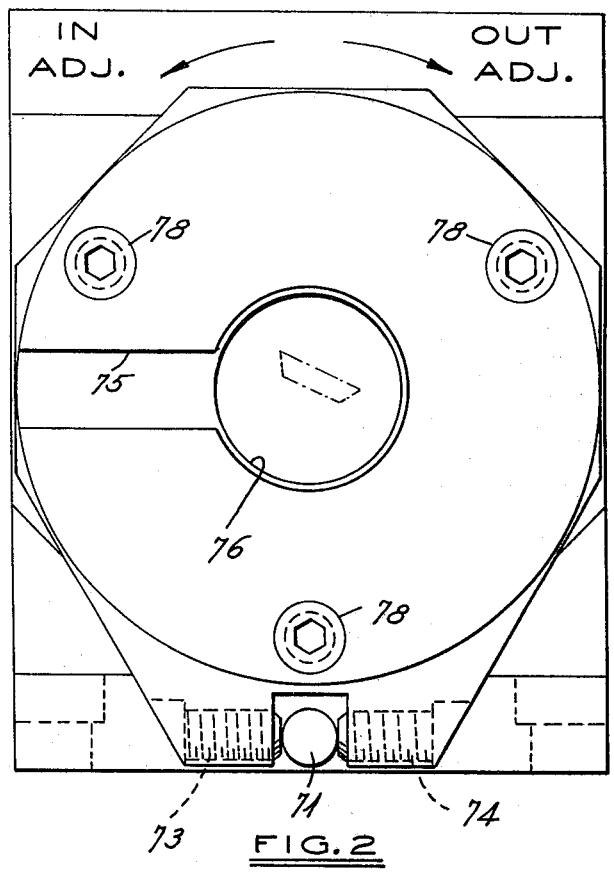
FIG. 2 is a front view of the tool holder showing the mounting flange, centering means and calibrated dial.

The tool holder assembly 10 can now be shown to have two basic methods of adjustment — circumferential movement of the tool point, i.e., in a plane perpendicular to the axis, and an axial movement of the tool point. The axial movement of the tool point, which can be adjusted through a given range, is adjusted by means of a spanner wrench inserted in bore 70 of axial adjustment nut 62 by moving the spanner wrench as shown in FIG. 2. In or out adjustment can be achieved through the micrometer threads 65 and 63 and the axial adjustment nut bearing on the caged needle thrust bearing 56 against body 17.

As the axial adjustment nut 62 is turned clockwise, as viewed in FIG. 2, the tool point will move in an outward direction compressing springs 55 against needle bearings 56 which are caged to surface 58 of the eccentric bushing 30. As the axial adjustment nut 62 is rotated counterclockwise, the springs 55 will now push the needle bearings 56 backward allowing the tool point to move inward or toward the rear of the body. Thus, once the preload on the bearing race tolerances is established, all of the toerances and slack in any of the dimensions of the mating parts are taken out and the assembly will give a rigid action to the cutting tool.

Figure 3:
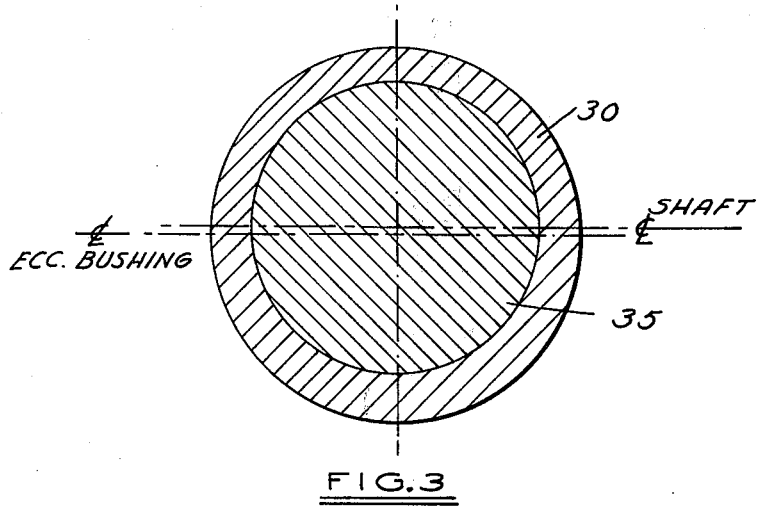
FIG. 3 is a cross section of the conical eccentric section, taken along line 3—3 of FIG. 1.

To adjust the circumferential movement of the cutting tool, a spanner wrench is inserted in hole 54 of the eccentric bushing 30 and is rotated clockwise or counterclockwise. As explained earlier, the eccentric bushing centerline is offset so that surfaces 36 and 32 will engage and allow an approximate 0.012 total circular movement in the present illustration of the tool point about the eccentric bushing centerline. The ball bearings 43 and bearing race 42 allow this adjustment to be smooth and efficient. This eccentricity between the eccentric bushing 30 and the face plate and shaft 35 can be seen in FIG. 3.

Thus, the ability to minutely adjust the tool tip in both the horizontal and axial direction can be achieved with micrometer accuracy without loosening any portions of the tool from its mounting plate or the tool from its tool holder. As can be visualized, the horizontal movement of the tool point will be in an arc giving a horizontal movement perpendicular to the axial movement. A major advantage of this adjustable tool holder is that the preloaded bearings 43 with bearing race 42 will act to counteract any tool load forces that occur during a normal cutting or turning operation. The rigidity of this combination is superior to that achieved in existing devices. This tool holder can be used in turning and boring operations or as a combination tool for turning and facing or boring and facing operations as well.

While it is felt by the inventor that this invention has been set forth in as full a description as possible, it is understood that modifications could be made to this tool holder without departing from the scope of the following claims.

What is claimed is:

1. An adjustable tool holder adapted to receive a flanged or shank mounted tool comprising:
   a. a body;
   b. a shaft;
   c. an eccentric bushing means;
   d. a means for holding said eccentric bushings and said shaft in body;
   e. an adjustment means for moving tool affixed to said shaft axially;
   f. an adjustment means for moving tool in a plane perpendicular to axial movement; and
   g. said perpendicular adjustment means is eccentric surface between said shaft means and bushing means wherein the eccentric surface and shaft are affixedly preloaded with a ball bearing and nut means.

2. The device of claim 1 wherein axial adjustment means comprises a nut means threaded on shaft means in communication with body means and eccentric bushing means in communication with spring restraining means in body.

3. The device of claim 2 wherein said nut means for moving tool in a plane parallel to the mounting plate embodies a micrometer thread.

4. The device of claim 1 wherein a dowel pin means restrains shaft rotation allowing tool movement in a vertical plane perpendicular to axial movement.

5. The device of claim 1 wherein eccentric bushing means coact with a first bearing means and said shaft means, coact with second bearing means.

6. An adjustable tool holder adapted to receive a flanged or shank mounted tool comprising:
   a. a body;
   b. a shaft;
   c. an eccentric bushing means;
   d. a means for holding said eccentric bushing and shaft in body;
   e. adjustment means for moving tool in a perpendicular plane to said shaft axis; and
   f. said adjustment means is eccentric surface between said shaft means and bushing means wherein eccentric surface and shaft are affixedly preloaded with a ball bearing and nut means.

7. The device of claim 5 wherein the first and second bearing means are needle bearings.

8. The device of claim 6 wherein a dowel pin means restrains shaft rotation allowing tool movement in a vertical plane perpendicular to shaft axis.

9. An adjustable tool holder adapted to receive a flanged or shank mounted tool comprising:
   a. a body affixedly held to a mounting plate;
   b. a face plate and shaft disposed in said body;
   c. bushing means disposed between shaft and body;
   d. a means for holding said bushing and said shaft in body;
   e. adjustment means for axial movement of the tool comprising a nut means threaded on shaft means coacting with body means and bushing means coacting with spring retaining means in body; and
   f. pin means for restraining tool rotation.

10. The device of claim 9 wherein said adjustment nut means for moving tool in a plane parallel to mounting plate embodies a micrometer thread.

11. The device of claim 9 wherein dowel pin means disposed in mounting plate coacts with face plate restricting the adjustment of tool in a plane parallel to said shaft axis.

12. The device of claim 9 wherein the bushing means and shaft means are affixedly preloaded with a ball bearing and nut holding means.

* * * * *

UNITED STATES PATENT AND TRADEMARK OFFICE
CERTIFICATE OF CORRECTION

PATENT NO. : 3,918,333
DATED : November 11, 1975
INVENTOR(S) : Gary R. Ebert and Roy H. Flones It is certified that error appears in the above-identified patent and that said Letters Patent are hereby corrected as shown below:

Column 3, line 4; delete "tolerances" insert --42--.

Column 3, line 5; delete "toerances" insert --tolerances--.

Signed and Sealed this

Seventh Day of September 1976

[SEAL]

Attest:

RUTH C. MASON
Attesting Officer

C. MARSHALL DANN
Commissioner of Patents and Trademarks